United States Patent
Schipon et al.

(10) Patent No.: US 10,817,074 B2
(45) Date of Patent: Oct. 27, 2020

(54) ADAPTIVE KEYBOARD

(71) Applicant: International Business Machines Corporation, Armonk, NY (US)

(72) Inventors: Nancy A. Schipon, Apex, NC (US); Lorin Ullmann, Austin, TX (US); Jack P. Yapi, Knightdale, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/165,505

(22) Filed: Oct. 19, 2018

(65) Prior Publication Data
US 2020/0125182 A1  Apr. 23, 2020

(51) Int. Cl.
*G06F 3/02* (2006.01)
*G06F 3/023* (2006.01)

(52) U.S. Cl.
CPC .......... *G06F 3/0216* (2013.01); *G06F 3/0233* (2013.01)

(58) Field of Classification Search
CPC .......... G06F 3/016; G06F 3/012; G06F 3/013; G06F 3/023; G06F 3/0338; G06F 3/02
See application file for complete search history.

(56) References Cited

U.S. PATENT DOCUMENTS

| | | | |
|---|---|---|---|
| 4,597,681 A * | 7/1986 | Hodges | B41J 5/10 200/331 |
| 5,775,822 A | 7/1998 | Cheng | |
| 6,536,966 B1 | 3/2003 | Butler | |
| 7,064,472 B2 * | 6/2006 | Pelrine | F04B 35/04 310/324 |
| 7,780,368 B2 * | 8/2010 | Longobardi | G06F 1/1616 400/472 |
| 7,876,199 B2 * | 1/2011 | Caine | G06F 3/016 340/407.1 |
| 2003/0011503 A1 | 1/2003 | Levenson | |
| 2003/0048260 A1 * | 3/2003 | Matusis | G06F 3/0481 345/173 |
| 2004/0009788 A1 * | 1/2004 | Mantyjarvi | G06F 3/016 455/550.1 |
| 2004/0038186 A1 * | 2/2004 | Martin | G09B 21/003 434/113 |

(Continued)

FOREIGN PATENT DOCUMENTS

| | | |
|---|---|---|
| WO | 1983000308 A1 | 2/1983 |
| WO | 02063455 A1 | 8/2002 |

OTHER PUBLICATIONS

Anonymous, "Find Materials and Filaments for 3D Printing", Online retrieved URL:<http://www.stratasys.com/materials/polyjet/rubber-like>, 36 pages.

(Continued)

*Primary Examiner* — Olga V Merkoulova (74) *Attorney, Agent, or Firm* — Cantor Colburn LLP; Teddi Maranzano (57) ABSTRACT

An adjustable keyboard is provided. The adjustable keyboard includes keys, a housing to house the keys and a control system. The housing includes modifiable material between at least first and second ones of the keys. The control system controls the modifiable material to modify a positional relationship between at least the first and second keys.

15 Claims, 6 Drawing Sheets

(56) References Cited

U.S. PATENT DOCUMENTS

| | | | | |
|---|---|---|---|---|
| 2005/0253643 | A1* | 11/2005 | Inokawa | G06F 3/0425 327/517 |
| 2006/0238510 | A1* | 10/2006 | Panotopoulos | G06F 3/0202 345/168 |
| 2008/0248248 | A1* | 10/2008 | Caine | G06F 1/1616 428/152 |
| 2009/0015560 | A1* | 1/2009 | Robinson | G06F 3/016 345/168 |
| 2009/0128376 | A1* | 5/2009 | Caine | H04M 1/23 341/34 |
| 2017/0068318 | A1* | 3/2017 | McClure | G06F 3/016 |
| 2020/0125182 | A1* | 4/2020 | Schipon | G06F 3/0233 |

OTHER PUBLICATIONS

Anonymous, "Kydex T .06 12in×24in", Online Retrieved URL:<https://www.buysend.com/en-US/Product/Details/171864?U=kydex-thermoplastic-sheet-black-12x-24-tandy-leather-craft-3475-02/&gclid=CjwKEAjw7ZHABRCTr_DV4_ejvgQSJACr-YcwFoeEecczE0lebxq36IJq8NLzTeKFxK2-PbxFdh09gxoCe4jw_wcB>, 2 pages.

Anonymous, "Materials that expand and contract", Online retrieve URL:<https://www.google.com/search?q=materials+that+expand+and+contract&cad=h>, 2 pages.

Anonymous, "Virtual Keyboard", Online Retrieved Oct. 3, 2018, URL:<https://www.brookstone.com/pd/virtual-keyboard/796246p.html>, 12 pages.

Hansman, "A New Material Could Make Medical Devices That Expand and Collapse", Mar. 18, 2016, URL<https://www.smithsonianmag.com/innovation/new-material-could-make-medical-devices-that-expand-collapse-180958454/>, 3 pages.

Anonymous, "An Incredible Shrinking Material", Online Retrieve URL:<https://www.caltech.edu/news/incredible-shrinking-material-1733>, 2 pages.

* cited by examiner

ADAPTIVE KEYBOARD

BACKGROUND

The present invention generally relates keyboards, and more specifically, to an adaptive keyboard that can be customized based on personalized usability traits.

In computing, a computer keyboard is a typewriter-style device that uses an arrangement of buttons or keys to act as mechanical levers or electronic switches. Keyboard keys (buttons) typically have characters engraved or printed on them and each press of a key or multiple keys at the same time typically corresponds to a single written symbol.

In normal usages, the keyboard is used as a text entry interface for typing text and numbers into a word processor, text editor or any other program. In a modern computer, the interpretation of key presses is generally left to the software. A computer keyboard distinguishes each physical key from every other key and reports all key presses to the controlling software.

SUMMARY

Embodiments of the present invention are directed to an adjustable keyboard. A non-limiting example of the adjustable keyboard includes keys, a housing to house the keys and a control system. The housing includes modifiable material between at least first and second ones of the keys. The control system controls the modifiable material to modify a positional relationship between at least the first and second keys.

Embodiments of the present invention are directed to an adjustable keyboard. A non-limiting example of the adjustable keyboard includes keys, a housing to house the keys and a control system. The housing includes modifiable material surrounding each of the keys. The control system controls the modifiable material to modify respective positions of each of the keys.

Embodiments of the invention are directed to an adjustable keyboard system. A non-limiting example of the adjustable keyboard system includes keys, a housing to house the keys and including modifiable material between at least first and second ones of the keys and a control system. The control system includes a computing device for which actuation of the keys generate inputs, a processing unit to store user identifications and preferences associated therewith and to recognize a current user and an actuation unit to control the modifiable material to modify a positional relationship between at least the first and second keys in accordance with preferences associated with a user identification of the current user.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, cars have power seats to fit a wide range of people such as tall people, short people, people with long legs, people with short legs, etc. which allow most individuals to drive most vehicles. There are also different size vehicles made to accommodate a range of people. When it comes to keyboards, however, conventional keyboards are provided in a one size fits all configuration or, at best, allow for certain but limited customizations. As a general matter, though, a person with a relatively large hand uses the same keyboard as a person with smaller hand because keyboards are not typically able to be personalized to fit a given person's hand span, desired touch and keypad preference. This is the case even though such customization would allow for higher productivity and ergonomic considerations.

Turning now to an overview of the aspects of the invention, one or more embodiments of the invention address the above-described shortcomings of the prior art by providing for an adjustable keyboard. The adjustable keyboard includes keys, a housing to house the keys and including modifiable material between at least first and second ones of the keys and a control system by which the modifiable material is controlled to modify a positional relationship between at least the first and second keys.

The above-described aspects of the invention address the shortcomings of the prior art by providing an individual with the capability to customize a keyboard based on desire, comfort and ergonomic needs. This capability will allow one keyboard to be tailored to a specific size and overall fit and can be changed to be used by other individuals as well. This will allow for higher productivity and ergonomic considerations. In particular, the following description relates to an enhanced keyboard that has the ability for more than one person to be able to use it and to adjust it to their individual needs which include closer range keys or bigger keys, indentation of the keypads and an overall touch.

Figure 1:
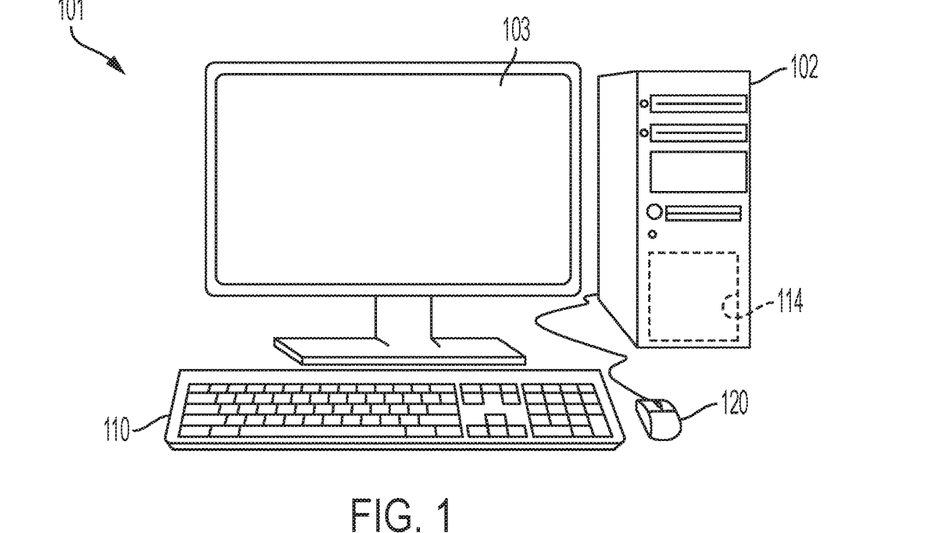
FIG. 1 is a schematic diagram of a computing system in accordance with embodiments of the present invention.

Turning now to a more detailed description of aspects of the present invention, FIG. 1, an adjustable keyboard system 101 is provided and includes a computer 102, a display unit 103, an adjustable keyboard 110 and other input devices 120. The display unit 103, the adjustable keyboard 110 and the other input devices 120 are operably coupled to the computer 102 such that user operations of the adjustable keyboard 110 and the other input devices 120 are interpreted as inputs that can be displayed on the display unit 103.

Figure 2A:
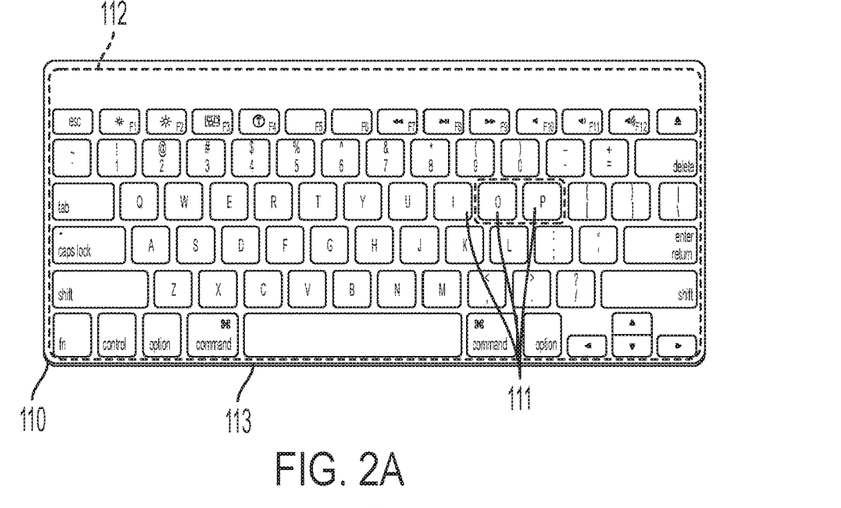
FIG. 2A is a top-down view of an adjustable keyboard in accordance with embodiments of the present invention.
Figure 2B:
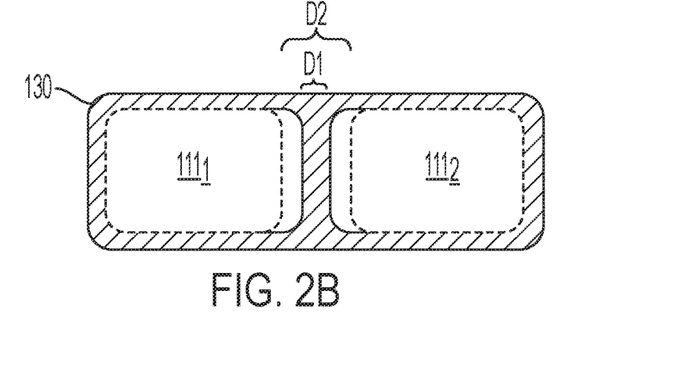
FIG. 2B is a schematic illustration of keys of the adjustable keyboard of the encircled portion of FIG. 2A.

With reference to FIGS. 2A and 2B, the adjustable keyboard 110 includes keys 111, that are associated with various differentiated inputs (i.e., letters and numbers), a circuit board 112 that includes key sensor cells, a housing 113 to house the keys 111 and the circuit board 112 and a control system 114 (see FIG. 1). As shown in FIG. 2B, the housing 113 includes modifiable material 130 that is operably interposed between at least first and second ones of the keys $111_1$ and $111_2$.

The modifiable material 130 can include a flexible material that allows the keys 111 to move up, down, left, right, forward and back. The modifiable material 130 can include or be provided as at least one or more of memory foam or memory metal, polyurethane, silicone polymer and rubber or another material that can be controlled by an electronic circuit.

Figure 3:
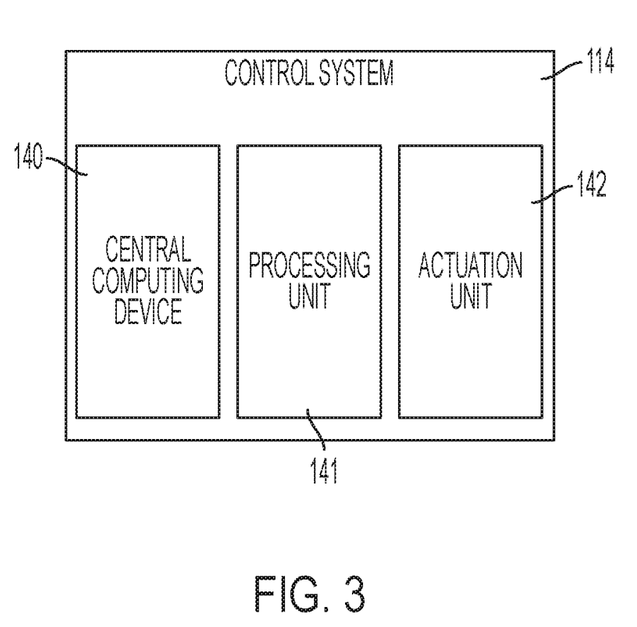
FIG. 3 is a schematic diagram of a control system of a computing device including an adjustable keyboard in accordance with embodiments of the present invention.

With reference to FIG. 3, the control system 114 can be provided in the computer 102 or the adjustable keyboard 110. In the former case, the control system 114 would be configured to respond to and control the adjustable keyboard 110 remotely or through a wired connection. In the latter case, the control system 114 would be configured to respond to and control the adjustable keyboard 110 locally and directly. The following description will relate to the former case, in which the control system 114 is provided in the computer 102. This is done for clarity and brevity and is not intended to otherwise limit the scope of the present invention.

The control system 114 includes a central computing device 140, a processing unit 141 and an actuation unit 142. The central computing device 140 is configured such that actuation of the keys 111 are recognized and used to generate inputs to the computer 102 for possible display on the display unit 103. The processing unit 141 can include a central processor and a memory unit. The memory unit has the capacity to store user identifications and preferences associated with the user identification and executable instructions that are readable and executable by the central processor. When the executable instructions are read and executed by the central processor, the executable instructions cause the central processor to recognize a current user and to access the user identification and the associated preferences of the current user. The user identification can be any data that uniquely identifies the current user. The preferences can describe various configurations of the adjustable keyboard 110 (i.e., an overall size of the adjustable keyboard 110, relative positioning of one or more keys 111, distances between one or more keys 111, etc.). The actuation unit 142 is configured to control the modifiable material 130 to modify a positional relationship between at least the first and second keys $111_1$ and $111_2$ in accordance with preferences associated with a user identification of the current user.

That is, if the current user has a relatively small hand he might wish to have the first and second keys $111_1$ and $111_2$ positioned at a relatively short distance D1 (see FIG. 2B) apart and thus he will set his preferences in accordance with that condition. Upon initiating a usage instance, the processing unit 141 will recognize the current user and access his user identification and preferences. The processing unit 141 will then issue instructions to the actuation unit 142 such that the actuation unit 142 engages to separate the first and second keys $111_1$ and $111_2$ by the relatively short distance D1. Conversely, if a different current user has a relatively large hand he might wish to have the first and second keys $111_1$ and $111_2$ positioned at a relatively large distance D2 (see FIG. 2B) apart and thus he will set his preferences in accordance with that condition. Upon initiating a usage instance, the processing unit 141 will recognize the different current user and access his user identification and preferences. The processing unit 141 will then issue instructions to the actuation unit 142 such that the actuation unit 142 engages to separate the first and second keys $111_1$ and $111_2$ by the relatively large distance D2.

Figure 4:
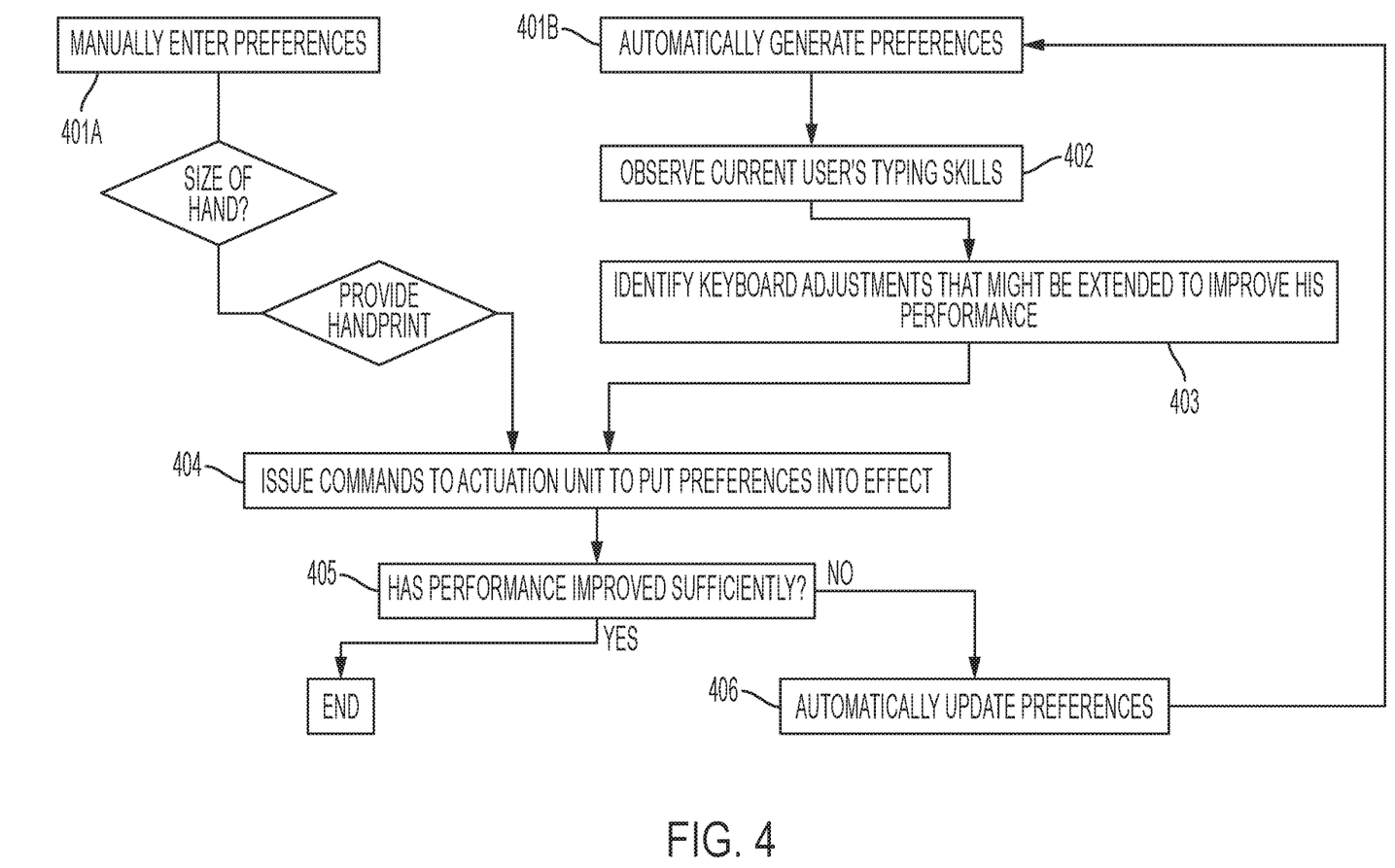
FIG. 4 is a flow diagram illustrating a method of automatically generating preferences for an adjustable keyboard in accordance with embodiments of the present invention.

With reference to FIG. 4 and in accordance with embodiments of the present invention, the processing unit 141 can develop preferences and execute keyboard adjustments based on those preferences automatically.

For example, during a given typing session with a current user whose preferences indicate a preference for a default or standard keyboard configuration, a user can manually enter preferences for keyboard adjustments by, e.g., described a hand size and/or by providing a handprint (401A). Alternatively, the processing unit 141 can automatically generate preferences for keyboard adjustments (401B), observe the current user's typing skills (402) and then identify alternative or additional keyboard adjustments that might be expected to improve his performance (403). In one exemplary case, if the processing unit 141 observes that the current user frequently hits the "0" and "P" buttons simultaneously or interchangeably by accident, the processing unit 141 can automatically generate a preference that dictates that the "0" and "P" buttons need to be separated from one another by a non-standard distance. Once the preferences are manually entered or automatically generated, the processing unit 141 can either request approval or immediately issue commands to the actuation unit 142 to put the automatically generated preferences into effect (404). Subsequently, the processing unit 141 can conduct further observations of the current user's typing skills and determine whether his performance has been improved as a result of the adjustment (405) and update the automatically or manually generated preference based on a result of the determination (406).

Figure 5A:
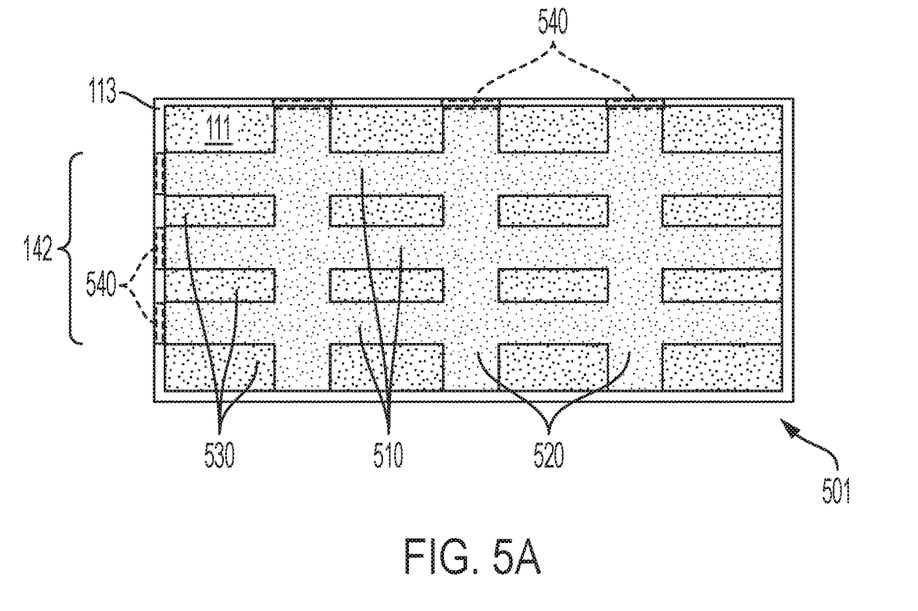
FIG. 5A is a schematic diagram of an operation of an adjustable keyboard in accordance with embodiments of the present invention.
Figure 5B:
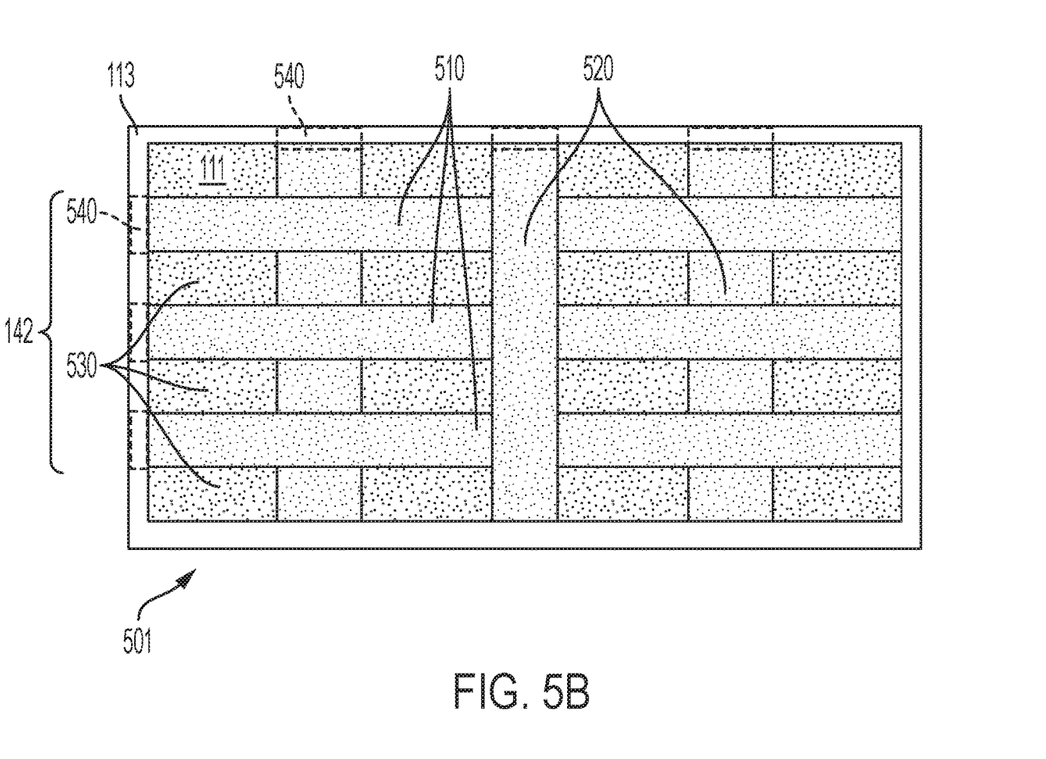
FIG. 5B is a schematic diagram of an operation of an adjustable keyboard in accordance with embodiments of the present invention.

With reference to FIGS. 5A and 5B and in accordance with embodiments of the present invention, the housing 113 can include modifiable material 130 surrounding each of the keys 111. In such cases, the actuation system 142 controls the modifiable material 130 to modify respective positions of each of the keys 111. That is, in a case in which the modifiable material 130 surrounds each of the keys 111, an entirety of the adjustable keyboard 110 can be adjusted and customized.

As shown in FIGS. 5A and 5B, in the case in which the modifiable material surrounds each of the keys 111, the housing 113 can include a lattice 501 of horizontal strips 510 and vertical strips 520 of the modifiable material 130 with the keys 111 operably disposed in interstitial regions 530 of the lattice 501 and the actuation unit 142 can include multiple electromechanical actuators 540 distributed about a perimeter of the housing 113. Here, in a case in which the current user's preferences are indicative of a smaller size for the adjustable keyboard 110, the multiple electromechanical actuators 540 can be engaged to effectively shrink the sizes of the interstitial regions 530 and to decrease the distances between adjacent interstitial regions 530 (see FIG. 5A). Conversely, in a case in which the current user's preferences are indicative of a larger size for the adjustable keyboard 110, the multiple electromechanical actuators 540 can be engaged to effectively enlarge the sizes of the interstitial regions 530 and to increase the distances between adjacent interstitial regions 530 (see FIG. 5B).

Figure 6:
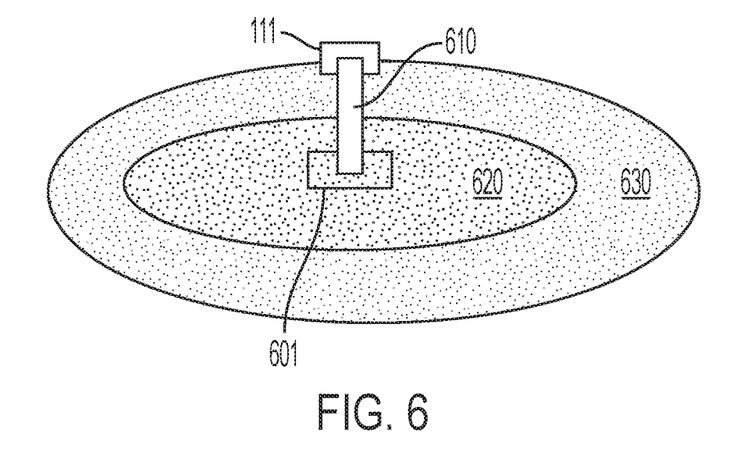
FIG. 6 is a schematic diagram of a key structure of an adjustable keyboard in accordance with embodiments of the present invention.

With reference to FIG. 6, each of the keys 111 can be is associated with a sensor cell 601 by a rigid or semi-rigid element. The rigid or semi-rigid element can be hollow and configured to encase flexible electrical wiring needed to open or close the switch for each of the keys 111 when the keys 11 are pressed. As shown in FIG. 6, a key 111 can be coupled to a sensor cell 601 of the circuit board 112 (see FIG. 2A) by a rigid or semi-rigid joystick 610 that is supported within moldable material 620, which is in turn supported within rigid or semi-rigid material 630. With this or another suitable construction, each key 111 can be capable of following the adjustments and modifications of the adjustable keyboard 110 without becoming decoupled from its sensor cell 601.

Figure 7:
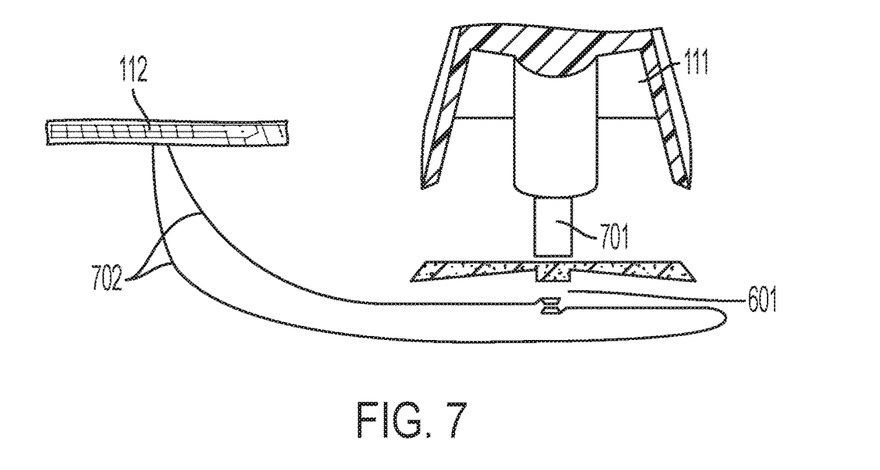
FIG. 7 is a schematic diagram of a key structure of an adjustable keyboard in accordance with embodiments of the present invention.

With reference to FIG. 7, a single key 111 is illustrated as being associated with a sensor cell 601 of the circuit board 112. As shown in FIG. 7, the single key 111 is coupled with the sensor cell 601 by a smart metal element 701 that allows the single key 111 to be moved up and down relative to the sensor cell 601 while the wiring 702 maintains a connection between the sensor cell 601 and the circuit board 112. In operation, the smart metal element 701 can be extended through exposure to current so that the single key 111 is moved upwardly relative to the sensor cell 601. This could be done to accommodate various users (e.g., a person with carpal tunnel, for example, who need the single key 111 to be made closer to his palm). Conversely, the smart metal element 701 can be retracted by the current being ceased so that the single key 111 is moved downwardly relative to the sensor cell 601. This could be done to accommodate a person with a healthy hand who would prefer to the single key 111 to be closer to the sensor cell 601 with a correspondingly reduced key stroke.

Figure 8:
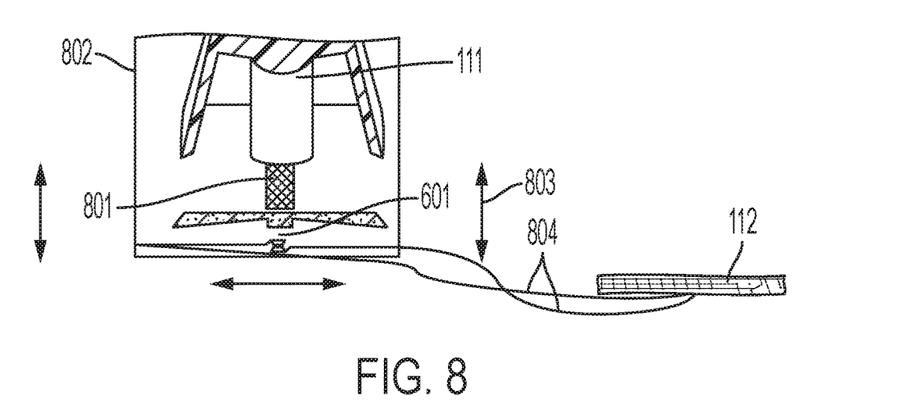
FIG. 8 is a schematic diagram of a key structure of an adjustable keyboard in accordance with embodiments of the present invention.

With reference to FIG. 8, a single key 111 is illustrated as being associated with a sensor cell 601 of the circuit board 112. As shown in FIG. 8, the single key 111 is fixed relative to the sensor cell 601 by a fixed element 801 to form a key assembly 802. The key assembly 802 is supported within a smart metal base 803 with flexible wiring 804 maintaining a connection between the sensor cell 601 and the circuit board 112. In operation, the smart metal base 803 can be manipulated through exposure to one or more currents so that the single key 111 is moved upwardly or downwardly, left or right and toward or away from a user. As above, any one or more of these movements could be done to accommodate various users.

In accordance with embodiments, the flexible wiring 804 of FIG. 8 can include or be provided as wires formed of smart metal material that are hollow and encase electrical wiring that connects the sensor cell 601 with the circuit board 112. Such flexible wiring 804 allows the key assembly

802 to remain in electrical communication with the circuit board 112 even while the key assembly 802 is moved.

In the embodiments of FIGS. 5A, 5B and 6-8, the circuit board 112 can include a processing unit that is configured to control the various configurations made possible by the structures described herein. The processing unit can include a processor, a memory unit, an input/output (I/O) unit and a servo control unit. The processor communicates with the memory and the servo control unit as well as other devices and sensors by way of the I/O unit. The memory unit has executable instructions stored thereon, which are readable and executable by the processor. When the executable instructions are read and executed by the processor, the executable instructions cause the processor to operate as described herein (see, e.g., FIG. 9 and the accompanying text).

Figure 9:
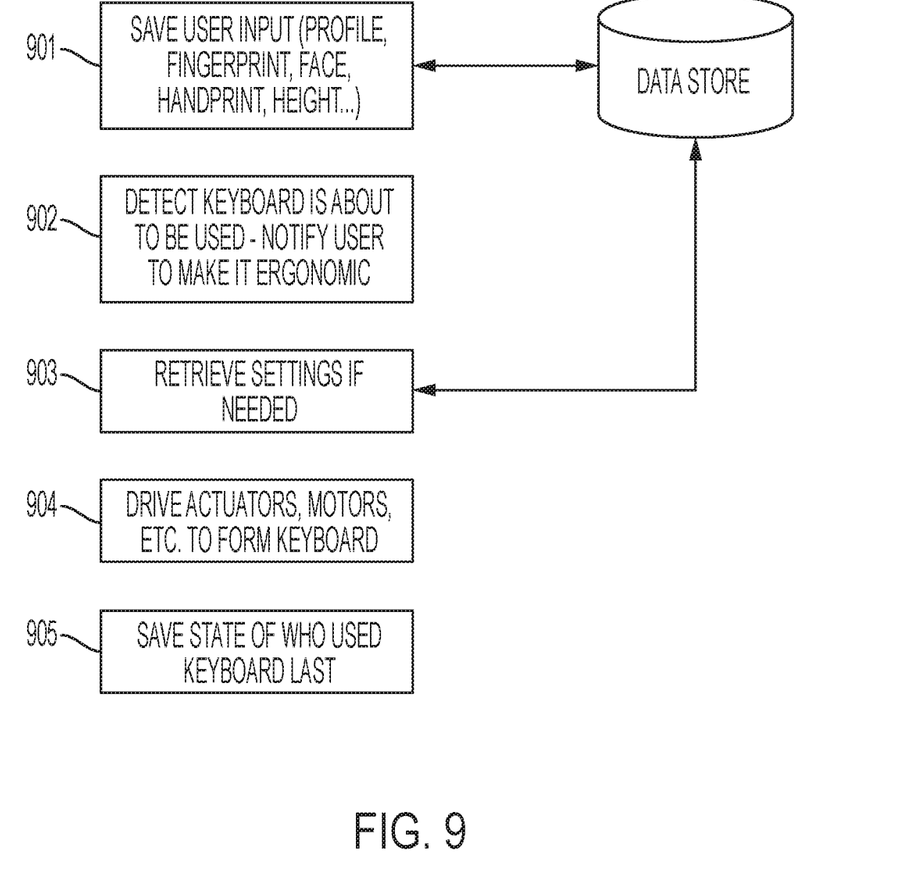
FIG. 9 is a flow diagram illustrating a method of operating an adjustable keyboard in accordance with embodiments of the present invention.

With reference to FIG. 9, a method of operating the adjustable keyboard 110 is provided and includes saving one or more user identifications with preferences associated with the user identifications (901) and detecting that the adjustable keyboard 110 is about to be used (902). The method further includes retrieving the preferences or settings of the current user (903) and engaging the actuation unit 142 to effectuate those preferences (904). The method can be completed by the preferences being updated manually or automatically in accordance with at least one of the ergonomic measurements and typing skills of the user (905) and saved (906).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. An adjustable keyboard, comprising:
   a circuit board comprising sensor cells;
   keys respectively associated with corresponding ones of the sensor cells, wherein each of the keys is configured to be normally displaced from a corresponding one of the sensor cells and to be depressed along a key stroke into contact with the corresponding one of the sensor cells;
   a housing comprising a perimeter having first opposite sides and second opposite sides to house the circuit board, each of the sensor cells and each of the keys and comprising:
      horizontal strips of modifiable material extending horizontally between the first opposite sides of the perimeter of the housing and between at least first and second ones of the keys; and
      vertical strips of modifiable material extending vertically between the second opposite sides of the perimeter of the housing and between the at least first and second ones of the keys,
      the horizontal strips of the modifiable material and the vertical strips of the modifiable material forming a lattice in the housing surrounding the at least first and second ones of the keys, which are disposed in interstitial regions of the lattice; and
   a control system by which the horizontal strips of the modifiable material are controlled to modify a horizontally oriented positional relationship between the at least first and second ones of the keys and by which the vertical strips of the modifiable material are controlled to modify a vertically oriented positional relationship between the at least first and second ones of the keys.

2. The adjustable keyboard according to claim 1, wherein each of the keys is associated with the corresponding one of the sensor cells by a rigid or semi-rigid element.

3. The adjustable keyboard according to claim 1, wherein the control system comprises an electromechanical actuator.

4. The adjustable keyboard according to claim 1, wherein the control system modifies the horizontally oriented and vertically oriented positional relationships in accordance with an identification of a user and a recognition of preferences associated with that user.

5. An adjustable keyboard, comprising:
   a circuit board comprising sensor cells;
   keys respectively associated with corresponding ones of the sensor cells, wherein each of the keys is configured to be normally displaced from a corresponding one of the sensor cells and to be depressed along a key stroke into contact with the corresponding one of the sensor cells;
   a housing comprising a perimeter having first opposite sides and second opposite sides to house the circuit board, each of the sensor cells and each of the keys and comprising:
      horizontal strips of modifiable material extending horizontally between the first opposite sides of the perimeter of the housing and between the keys; and
      vertical strips of modifiable material extending vertically between the second opposite sides of the perimeter of the housing and between the keys,
      the horizontal strips of the modifiable material and the vertical strips of the modifiable material forming a lattice in the housing surrounding each of the keys, which are disposed in interstitial regions of the lattice; and
   a control system by which the horizontal strips of the modifiable material are controlled to modify respective horizontally oriented positions of each of the keys and by which the vertical strips of the modifiable material are controlled to modify respective vertically oriented positions of each of the keys.

6. The adjustable keyboard according to claim 5, wherein each of the keys is associated with the corresponding one of the sensor cells by a rigid or semi-rigid element.

7. The adjustable keyboard according to claim 5, wherein the control system comprises electromechanical actuators.

8. The adjustable keyboard according to claim 5, wherein control system modifications are in accordance with an identification of a user and a recognition of preferences associated with that user.

9. An adjustable keyboard system, comprising:
   a circuit board comprising sensor cells;
   keys respectively associated with corresponding ones of the sensor cells, wherein each of the keys is configured to be normally displaced from a corresponding one of the sensor cells and to be depressed along a key stroke into contact with the corresponding one of the sensor cells;
   a housing comprising a perimeter having first opposite sides and second opposite sides to house the circuit board, each of the sensor cells and each of the keys and comprising:
      horizontal strips of modifiable material extending horizontally between the first opposite sides of the perimeter of the housing and between at least first and second ones of the keys; and vertical strips of modifiable material extending vertically between the second opposite sides of the perimeter of the housing and between the at least first and second ones of the keys, the horizontal strips of the modifiable material and the vertical strips of the modifiable material forming a lattice in the housing surrounding each of the at least first and second ones of the keys, which are disposed in interstitial regions of the lattice and a control system comprising:

a computing device for which actuation of the keys generate inputs;

a processing unit to store user identifications and preferences associated therewith and to recognize a current user; and an actuation unit to control the horizontal and vertical strips of the modifiable material to modify a horizontally and vertically oriented positional relationships between the at least the first and second ones of the keys, respectively, in accordance with preferences associated with a user identification of the current user.

10. The adjustable keyboard system according to claim 9, wherein each of the keys is associated with the corresponding one of the sensor cells by a rigid or semi-rigid element.

11. The adjustable keyboard system according to claim 9, wherein the control system comprises an electromechanical actuator.

12. The adjustable keyboard system according to claim 9, wherein the control system modifies the horizontally and vertically oriented positional relationships in accordance with an identification of a user and a recognition of preferences associated with that user.

13. The adjustable keyboard system according to claim 9, wherein the processing unit stored user identifications and preferences associated therewith for multiple users.

14. The adjustable keyboard system according to claim 9, wherein users can input and save and update preferences associated with their user identifications.

15. The adjustable keyboard system according to claim 9, wherein the processing unit is configured to automatically generate preferences associated with a user identification of a user in accordance with at least one of:

ergonomic measurements of the user, and typing skills of the user.

* * * * *